Figure 1:
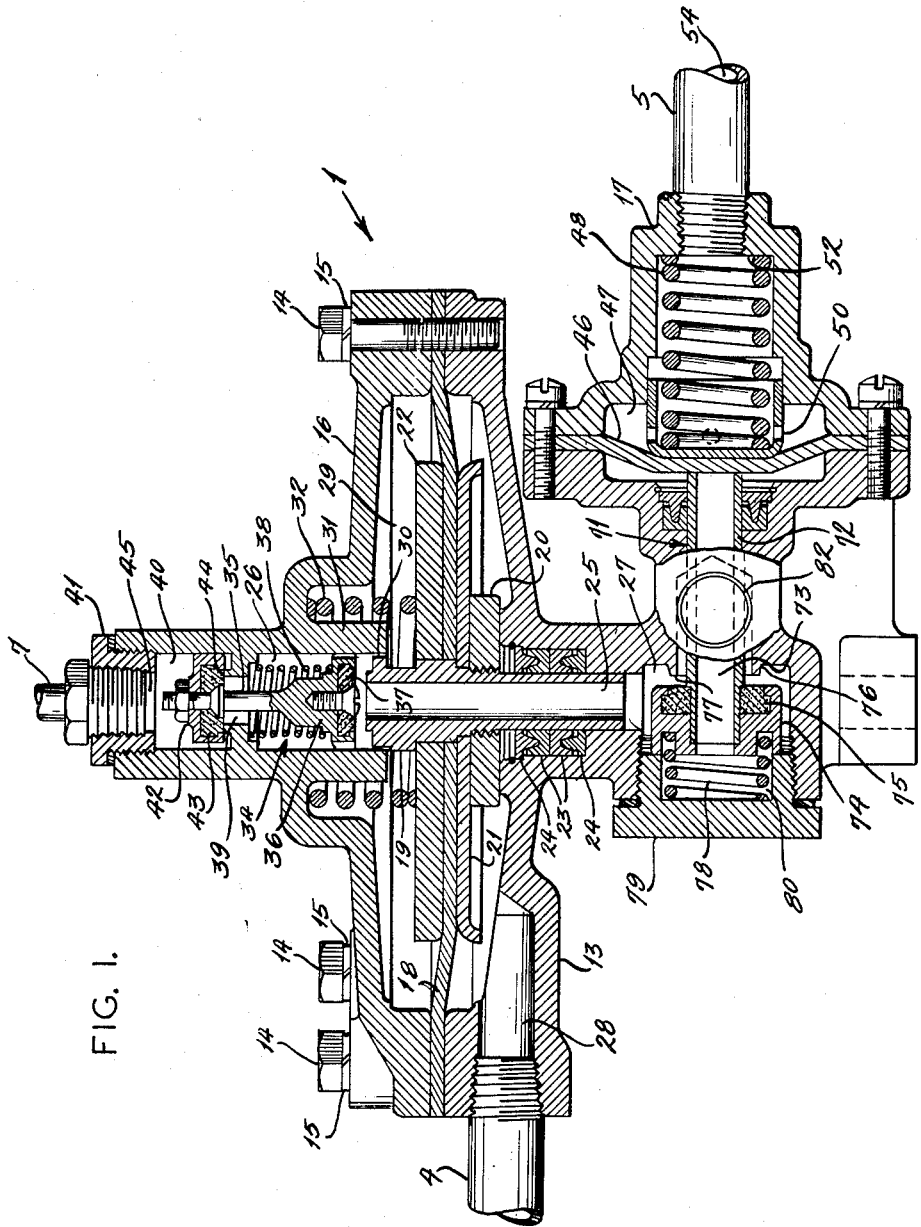

Sept. 28, 1954

C. B. FITES ET AL 2,690,359

EMERGENCY RELAY VALVE

Filed March 17, 1950

4 Sheets-Sheet 1

INVENTORS:
Cyril B. Fites
and Stanley Ryan,
by Carr & Carr & Gravely,
THEIR ATTORNEYS.

INVENTORS:
Cyril B. Fites
and Stanley Ryan,
by Carr & Carr & Stavely,
THEIR ATTORNEYS.

Patented Sept. 28, 1954

2,690,359

UNITED STATES PATENT OFFICE 2,690,359

EMERGENCY RELAY VALVE

Cyril B. Fites, St. Johns, and Stanley Ryan, Ferguson, Mo., assignors to Wagner Electric Corporation, St. Louis, Mo., a corporation of Delaware Application March 17, 1950, Serial No. 150,176

1 Claim. (Cl. 303—26)

This invention relates to relay valves of the kind used in fluid pressure brake systems for automotive vehicles for applying fluid pressure to a fluid operated brake cylinder located at a distance from a main source of fluid pressure, such as in the case of brakes on a trailer of a tractor-trailer combination or on the rear brakes of a truck with a long wheel base, so as to cause the remotely located brakes to operate in response to an operator's action as quickly as the front wheel brakes of the vehicle, said relay valve having therein an emergency means for automatically applying the remotely located brakes when the pressure in the main reservoir falls below a predetermined value for any reason.

This invention is used in combination with a fluid pressure braking system having a main reservoir, and auxiliary reservoir, brake operating cylinders, and a brake application valve.

The principal object of this invention is to provide in a fluid pressure braking system, a relay valve with an emergency feature therein which gives a rapid and positive braking action.

Another object of this invention is to provide a valve which meters the amount of pressure fluid applied to the remotely located brakes so that an operator can "feel" the application of said remotely located brakes and control said application in proportion to the application of his manual control means.

Still another object is to provide in a relay valve, an emergency means which when actuated allows pressure fluid to flow directly from the auxiliary reservoir to the brake operating cylinders without moving any part in the relay valve body portion which operates under normal non-emergency conditions.

The invention consists in an emergency relay valve mechanism comprising a housing having a resilient means therein, a normally open exhaust valve operatively connected to said resilient means, an exhaust valve head adapted for closing said exhaust valve, a valve stem secured to said exhaust valve head, said valve stem having a normally closed actuating valve secured thereto and adapted for opening after said exhaust valve has closed, and an independent emergency means comprising an emergency resilient means operatively connected to the brake operating cylinders for allowing pressure fluid to be supplied thereto, said emergency resilient means being responsive to pressure from the main reservoir for rendering said emergency means operative or inoperative.

The invention also consists in the parts and arrangements and in the combination of parts hereinafter described and claimed.

Figure 2:
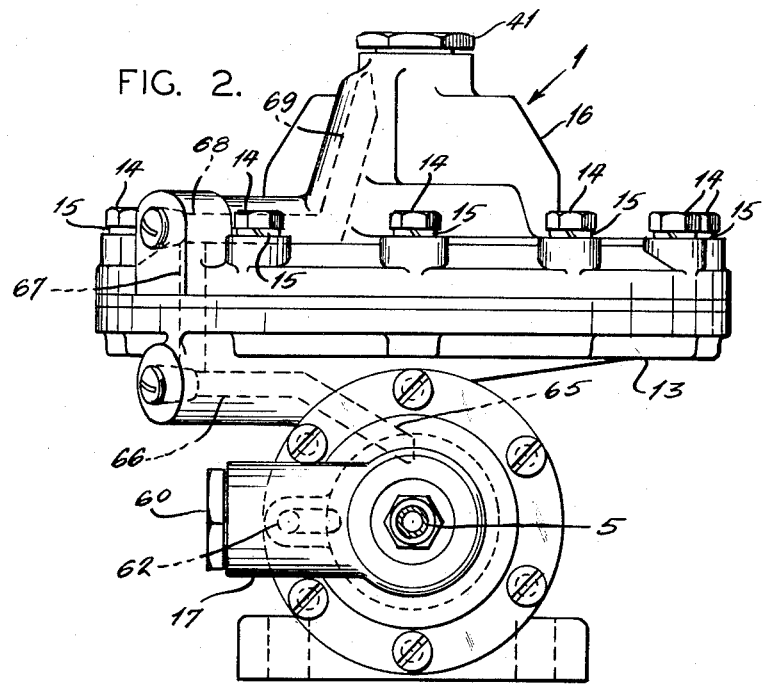
Figure 3:
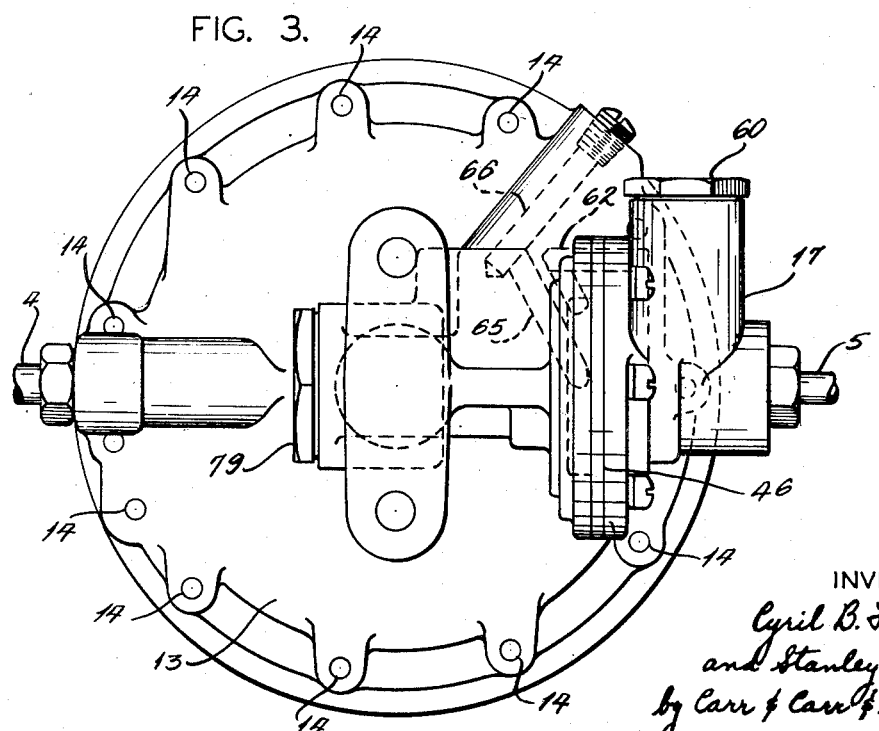
Figure 4:
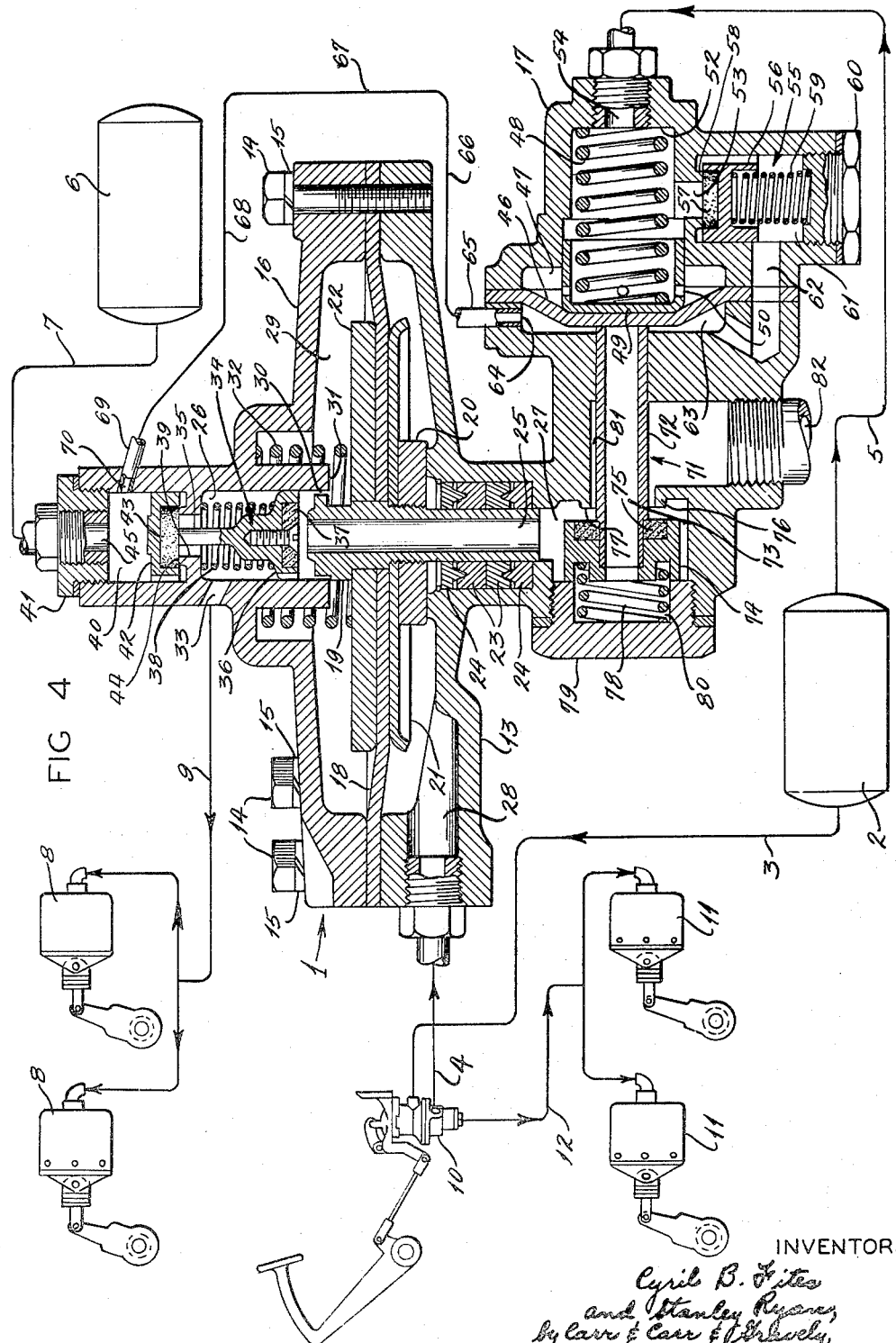
Figure 5:
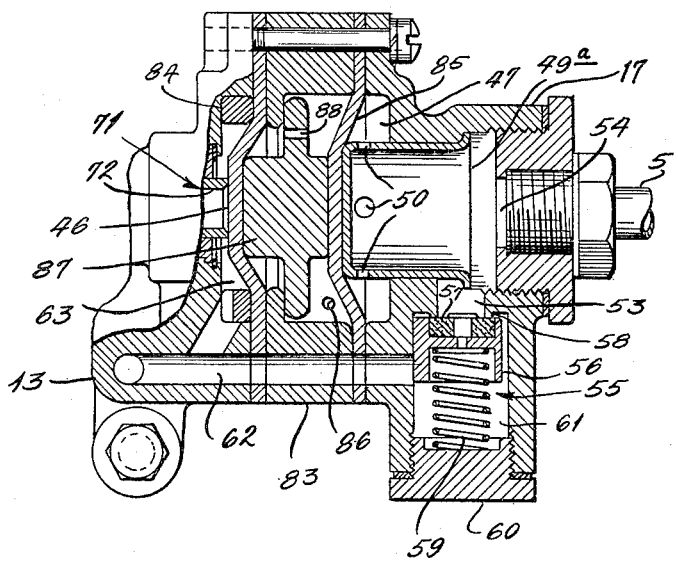

In the accompanying drawings, which form part of this specification and wherein like numerals refer to like parts wherever they occur:

Fig. 1 is a longitudinal cross-sectional view of our emergency relay valve,

Fig. 2 is a side view of the valve looking at the right side of the valve as shown in Fig. 1, Fig. 3 is a bottom view of the valve shown in Fig. 1, Fig. 4 is a diagrammatic view of a fluid pressure braking system showing a longitudinal cross-sectional view of the emergency relay valve in a slightly modified form to permit an easier understanding of the description and operation of said device, and Fig. 5 is a fragmentary diagrammatic view of a slightly modified form of an emergency means for the emergency relay valve shown in Fig. 4.

In Fig. 4 of the accompanying drawing, this emergency relay valve 1 is shown embodied in a system having a main reservoir 2 supplied with fluid under pressure from a source not shown and connected with said emergency relay valve 1 by means of a line 3 and a main reservoir line 4 and an emergency line 5, an auxiliary reservoir 6 adapted for receiving pressure fluid from said main reservoir 2 and connected with the emergency relay valve 1 by an auxiliary reservoir line 7, said emergency relay valve 1 and the auxiliary reservoir 6 being located near rear brake operating cylinders 8 which receive pressure fluid from said auxiliary reservoir 6 through a portion of said emergency relay valve 1 and rear brake operating cylinder line 9, and a brake application valve 10 connected with said main reservoir 2 by the line 3. Front brake operating cylinders 11 are connected to the brake application valve 10 by means of a front brake operating cylinder line 12. The rear brake operating cylinders 8 are remotely located and may be on the trailer of a tractor-trailer or on the rear brakes of a truck having a long wheel base. The front brake operating cylinders 11 may be located on the front and/or the rear brakes of a tractor in a tractor-trailer combination or on the front brakes of a truck having a long wheel base.

The emergency relay valve 1 comprises a main valve body portion 13 having rigidly secured thereto by means of machine screws 14 with lockwashers 15, a relay valve body portion 16 and an emergency valve body portion 17. Secured between said main valve body portion 13 and said relay valve body portion 16 by its outer edge is a diaphragm 18 having a central opening therein for receiving an exhaust valve stem 19 rigidly mounted thereon by means of a diaphragm nut 20 and a diaphragm plate 21 cooperating with a stop plate 22 mounted on said exhaust valve stem 19 on the opposite side of said diaphragm 18. Fitting circumferentially over the exhaust valve stem 19 and mounted in the main valve body portion 13 are packing cups 23 and packing cup retainers 24. The exhaust valve stem 19 is provided with an exhaust valve stem passage 25 which connects a valve chamber 26 with an intermediate chamber 27.

A cavity is provided in the main valve body portion 13 which in conjunction with the diaphragm 18 forms an application chamber 28. A cavity is also provided in the relay valve body portion 16 which in conjunction with the diaphragm 18 forms an equalizing chamber 29.

The equalizing chamber 29 is connected with the valve chamber 26 by means of an annular passageway 30 formed between a cylindrical portion 31 in the relay valve body portion 16 and said exhaust valve stem 19 which is in axial relation therewith. A diaphragm return spring 32 is positioned over said cylindrical portion 31 so as to rest between the relay valve body portion 16 and the stop plate 22. The valve chamber 26 has an outlet port 33 therein for connection with the rear brake operating cylinder line 9 and the rear brake operating cylinders 8. An exhaust-actuating valve 34 is located within said valve chamber 26. The exhaust-actuating valve 34 comprises an exhaust-actuating valve stem 35 having an exhaust valve head 36 thereon with an exhaust valve head insert 37 therein, said exhaust valve head insert 37 being in axial alignment with the exhaust valve stem 19 to control the opening of the exhaust valve stem passage 25 therein, and an actuating valve spring 38 positioned over said exhaust-actuating valve stem 35 between the exhaust valve head 36 and a rib section 39 which is a part of the relay valve body portion 16. The exhaust-actuating valve stem 35 is extended above said rib section 39 into an actuating chamber 40 formed by an actuating chamber cap 41 and the relay valve body portion 16. Secured to the upper end of the said exhaust-actuating valve stem 35 is an actuating valve head 42 with an actuating valve head insert 43 therein in abutting relation to an actuating valve seat 44 located on said rib section 39 for controlling the opening formed adjacent to said rib section 39 between the valve chamber 26 and the actuating chamber 40. An auxiliary reservoir port 45 is provided in the actuating chamber 40 as a means for connecting said actuating chamber 40 with the auxiliary reservoir line 7.

Secured between the main valve body portion 13 and the emergency valve body portion 17 by its outer edge portion is an emergency diaphragm 46 which together with the upper portion of said emergency valve body portion 17 forms an inlet chamber 47. A primary emergency spring 48 having thereon a primary emergency spring follower 49 with follower orifices 50 therein is positioned in said inlet chamber 47 and between said emergency diaphragm 46 and a flange 52 in said emergency valve body portion 17. The inlet chamber 47 has an opening 53 therein and an inlet port 54.

In the lower portion of the emergency valve body portion 17 is a check valve 55 for allowing the flow of pressure fluid in only one direction, said check valve 55 comprising a slidable check valve head 56 with a check valve head insert 57 therein in abutting relation to a check valve seat 58 in said emergency valve body portion 17, and a check valve spring 59 positioned between said check valve head 56 and a check valve spring cap 60 which forms a closure means for the emergency valve body portion 17. The lower portion of said emergency valve body portion 17 and the check valve spring cap 60 form a check valve chamber 61.

A duct 62 connects the check valve chamber 61 with an emergency application chamber 63. A main valve body port 64 in the emergency application chamber 63 leads to passage 65, horizontal passage 66, vertical passage 67, and passages 68 and 69 which lead into a relay valve body port 70 in the actuating chamber 40 in the relay valve body portion 16.

Slidably mounted on the opposite side of the emergency diaphragm 46 from the primary emergency spring 48 and in axial alignment therewith is an emergency valve 71 comprising an emergency valve stem 72 having an emergency valve stem passage 73 therethrough, an emergency valve head 74 with an emergency valve head insert 75 therein. A shoulder 76 in the main valve body portion 13 forms an emergency valve seat 77 for said emergency valve 71.

A secondary emergency spring 78 is positioned between said emergency valve head 74 and a secondary emergency spring cap 79 which forms a closure means for the main valve body portion 13. The secondary emergency spring 78 will move the emergency valve stem 72 rightwardly to seat the emergency valve head insert 75 on the emergency valve seat 77 if not prevented from doing so by action of the emergency diaphragm 46 on the emergency valve stem 72 rightwardly to seat emergency spring cap 79 and the emergency valve head 74 form a secondary emergency chamber 80 which leads into the intermediate chamber 27 when the emergency valve head 74 moves away from the secondary emergency spring cap 79.

An annular exhaust chamber 81 which surrounds the emergency valve stem 72 connects the intermediate chamber 27 with an exhaust port 82 when the emergency valve head insert 75 is not biased against the emergency valve seat 77.

Under normal inoperative conditions, the parts and combinations of parts are in positions as shown in Fig. 4 of the accompanying drawings. The main reservoir 2 is under fluid pressure from any suitable source (not shown). When the pressure in said main reservoir 2 is sufficient to overcome the check valve spring 59, pressure fluid flows from said main reservoir 2 into the emergency line 5, the inlet port 54, into the inlet chamber 47 and through the opening 53 forcing the check valve 55 to open thereby allowing pressure fluid to flow into the check valve chamber 61, the duct 62, the emergency application chamber 63, the main valve body port 64, into the passage 65, horizontal passage 66, vertical passage 67, and passages 68 and 69 which lead into the relay valve body port 70, the actuating chamber 40, and through the auxiliary reservoir port 45, into the auxiliary reservoir line 7 and then into the auxiliary reservoir 6. The only pressure difference existing between the inlet chamber 47 and the emergency application chamber 63 is that difference due to the effects of the check valve spring 59. When the brake application valve 10 is actuated pressure fluid passes from the main reservoir 2, through the line 3 into said brake application valve 10, the main reservoir line 4 into the application chamber 28 to force the diaphragm 18 upwardly. Since the volume of the application chamber is small, pressure can be built up on the under side of the diaphragm 18 very quickly. This pressure forces the diaphragm 18 upwardly compressing the diaphragm return spring 32 and causing the exhaust valve stem 19 to move upwardly until it engages the exhaust valve head insert 37 creating an air seal therebetween thus closing the exhaust valve stem passage 25 in said exhaust valve stem 19. Continued upward movement of said diaphragm 18 and said exhaust valve stem 19 forces the exhaust-actuating valve 34 upwardly compressing the actuating valve spring 38 and causing the actuating valve head insert 43 to unseat from the actuating valve seat 44, thereby allowing pressure fluid from the auxiliary reservoir 6 to come therefrom through the auxiliary reservoir line 7, the auxiliary reservoir port 45, the actuating chamber 40, the valve chamber 26, the outlet port 33 and out through the rear brake operating cylinder line 9 into the rear brake operating cylinders 8.

While pressure fluid is flowing through the valve chamber 26 to the rear brake operating cylinders 8 a portion of said pressure fluid also flows through the clearance or passageway 30 between the exhaust valve stem 19 and the cylindrical portion 31 of the relay valve body portion 16 into the equalizing chamber 29. The passageway 30 is slightly restricted so as to prevent a pressure build up in the equalizing chamber 29 ahead of that pressure which results from the flow of pressure fluid to the rear brake operating cylinders 8 whereby such a condition if not prevented would cause a fluttering action of the movable parts in the relay valve body portion 16. As the pressure fluid enters the equalizing chamber 29 a pressure is created therein which in turn creates a force on the diaphragm 18. The pressure in the equalizing chamber 29 will therefore increase until the resultant force on the upper side of the diaphragm 18, due to the presence of the pressure fluid and the forces of the diaphragm return spring 32 and the actuating valve spring 38, overcomes the force acting on the underside of the diaphragm 18 in the application chamber 28. As this condition occurs the diaphragm 18 and the attached exhaust valve stem 19 are moved downwardly to allow the exhaust-actuating valve 34 to assume a "lapped" position; that is, a position where the actuating valve head insert 43 is resting upon the actuating valve seat 44 and the exhaust valve head insert 37 is still held against the end of the exhaust valve stem 19. Thus the pressure in the equalizing chamber 29, which is equal to the pressure in the rear brake operating cylinders 8 and in the valve chamber 26, remains constant until a further braking application is made by the operator by increasing the fluid pressure in the application chamber 28 whereupon the diaphragm 18 is again moved upwardly. The exhaust valve stem 19 carried by said diaphragm 18, by virtue of its contact with the exhaust valve head insert 37, will again unseat the actuating valve head insert 43 from the actuating valve seat 44 permitting a flow of pressure fluid from the auxiliary reservoir 6 as previously described. Consequently, it becomes evident that a given pressure in the application chamber 28 will produce a proportional pressure in the equalizing chamber 29 and the rear brake operating cylinders 8. The operator "feel" is produced by the forces acting on the upper side of the diaphragm 18 created primarily by the fluid pressure acting on said diaphragm 18 in the equalizing chamber 29.

When the operator reduces the pressure in the application chamber 28 by exhausting the pressure fluid at the brake application valve 10, the diaphragm 18 is moved downwardly under the influence of the greater pressure acting within the equalizing chamber 29 and the diaphragm return spring 32. The actuating valve head insert 43 having seated prior to the pressure reduction now being described, further movement of the exhaust-actuating valve 34 downwardly is prohibited. When there is a complete reduction of the pressure formerly developed in the application chamber 28 the diaphragm 18 and the exhaust valve stem 19 move sufficiently downward to break the contact between the end of said exhaust valve stem 19 and the exhaust valve head insert 37 thereby opening the exhaust valve stem passage 25 in said exhaust valve stem 19. The pressure fluid in the equalizing chamber 29, the valve chamber 26, the rear brake operating cylinder line 9 and the rear brake operating cylinders 8 is then exhausted through the exhaust valve stem passage 25, the intermediate chamber 27, the annular exhaust chamber 81, and the exhaust port 82 into the atmosphere.

When there is sufficient fluid pressure within the main reservoir 2 the parts and combinations of parts are in the position as shown in Fig. 4, that is, the primary emergency spring 48 forces the emergency diaphragm 46 leftwardly until said emergency diaphragm 46 engages the end of the emergency valve stem 72 thereby closing the emergency valve stem passage 73 and forcing the emergency valve head 74 against the secondary emergency spring cap 79 and compressing the secondary emergency spring 78.

Therefore, so long as the pressure in the main reservoir 2 and its associated pipe system remain above a predetermined value, the parts in the relay valve body portion 16 operate exactly as hereinbefore described. But should there be, for any reason such as a break in the emergency line 5, a sufficient lowering of fluid pressure in the main reservoir 2, the emergency line 5 and the inlet chamber 47, the greater fluid pressure in the emergency application chamber 63, which is the same as the fluid pressure in the auxiliary reservoir 6, will force the emergency diaphragm 46 rightwardly against the resistance of the primary emergency spring 48. The rightward movement of the emergency diaphragm 46 allows the secondary emergency spring 78 to force the emergency valve 71 to move rightwardly thereby unseating the emergency valve head 74 from the secondary emergency spring cap 79, seating the emergency valve head insert 75 against the emergency valve seat 77. Further rightward movement of said emergency diaphragm 46 will cause said emergency diaphragm 46 to unseat from the end of the emergency valve stem 72 thereby opening the emergency valve stem passage 73 thus allowing pressure fluid to flow from the auxiliary reservoir 6, into the auxiliary reservoir line 7 through the auxiliary reservoir port 45 into the actuating chamber 40, out through the relay valve body port 70, the passages 69 and 68, the vertical passage 67, the horizontal passage 66, the passage 65, through the main valve body port 64 into the emergency application chamber 63, through emergency valve stem passage 73 in the emergency valve stem 72, the secondary emergency chamber 80, the intermediate chamber 27 up through the exhaust valve stem passage 25 into the valve chamber 26, through the outlet port 33 into the rear brake operating cylinder line 9 and rear brake operating cylinders 8. Thus, the emergency feature of this device does not operate any of the internal parts of said device which are operated under normal conditions.

The brakes will remain in the applied position until the brake in the emergency line 5 or any other defect causing an insufficient pressure to be exerted against the emergency diaphragm 46 has been repaired so as to build up a pressure in the inlet chamber 47 sufficiently to neutralize the pressure acting on the opposite side of the emergency diaphragm 46 so that the primary emergency spring 48 can force the emergency diaphragm 46 to the left against the end of the emergency valve stem 72 thereby closing the emergency valve stem passage 73 and lifting the emergency valve head insert 75 from the emergency valve seat 77 thereby exhausting the pressure fluid from the rear brake operating cylinders 8 through the previously described passages, ports and chambers out through the exhaust port 82.

A modified form of this device is shown in Fig. 5. In this modification all parts are the same as in the principal form of the invention but for the addition of a diaphragm separator body portion 83 and some parts located within the emergency valve body portion 17. The outer edge portion of the emergency diaphragm 46 is secured between the main valve body portion 13 and the diaphragm separator body portion 83. The emergency diaphragm 46 together with the right end of the main valve body portion 13 form the emergency application chamber 63 which contains a ring 84 which decreases the effective area of said emergency diaphragm 46.

Secured between the diaphragm separator body portion 83 and the emergency valve body portion 17 by its outer edge portion is a third diaphragm 85 which together with the diaphragm separator body portion 83 forms a vented chamber 86 in which is slidably mounted a piston 87 having an aperture 88 therein, said piston 87 being in abutting relationship with the emergency diaphragm 46 and the third diaphragm 85. The vented chamber 86 contains a vent (not shown) so that said vented chamber 86 is maintained at atmospheric pressure at all times. The third diaphragm 85 has a greater effective area than the emergency diaphragm 46 because of the ring 84.

A follower member 49a having follower orifices 50 is positioned in the inlet chamber 47. The inlet chamber 47 is separated by the check valve 55 from the check valve chamber 61 having the duct 62 leading therefrom, which duct passes through the diaphragm separator body portion 83 into the emergency application chamber 63.

The operation of the relay portion of the modified form of this emergency relay valve is the same as that of the principal form. The operation of the emergency means of the modified form is as follows. Under normal conditions the force acting on the third diaphragm 85 is greater than the force acting on the emergency diaphragm 46 even though substantially the same fluid pressure is acting thereon. Because of the greater effective area of the third diaphragm 85 a greater force acts on said third diaphragm 85 which, through the piston 87, forces the emergency diaphragm 46 against the emergency valve stem 72 closing the emergency valve stem passage 73 therein. During an emergency condition, assuming that the pressure fluid in the inlet chamber 47 has been lost to the atmosphere due to a rupture in the connecting line or for any other reason, the fluid pressure in the emergency application chamber 63 forces the emergency diaphragm 46 away from the end of the emergency valve stem 72 allowing the passage of pressure fluid from the auxiliary reservoir 6 to the rear brake operating cylinders 8. The only resistance to the movement of the emergency diaphragm 46 is the force exerted on said emergency diaphragm 46 in said vented chamber 86 due to the atmospheric pressure existing therein. The forces on the third diaphragm 85 are neutralized since atmospheric pressure prevails on both sides of the third diaphragm 85 when there is a complete rupture of the emergency line 5 leading into the inlet port 54.

The elimination of the primary emergency spring 48 of the principal form results in an improvement in the operation of the emergency means of the emergency relay valve. This modification allows the setting of the trailer or rear brakes during an emergency condition when the pressure in the auxiliary reservoir 6 is too low to overcome the force of the primary emergency spring 48 in the principal embodiment to break the contact between the end of the emergency valve stem 72 and the emergency diaphragm 46.

The elimination of the primary emergency spring 48 in the principal form also eliminates the possibility that a leak in the system would allow the force of primary emergency spring 48 to overcome the force exerted on the emergency diaphragm 46 by the pressure fluid in the emergency application chamber 63 to again close the emergency valve stem passage 73 and move the emergency valve stem 72 sufficiently leftwardly to exhaust the pressure fluid from the rear brake operating cylinders 8.

What I claim is:

In a fluid pressure braking system having brake operating cylinders, a main reservoir and an auxiliary reservoir, lines connecting said main reservoir with said auxiliary reservoir and said auxiliary reservoir with said brake operating cylinders, a fluid pressure operated valve mechanism interposed in said lines for controlling the flow of pressure fluid from said auxiliary reservoir to said brake operating cylinders, a separate line for connecting said main reservoir with said fluid pressure operated valve mechanism, an application valve interposed in said separate line for controlling the flow of pressure fluid to said fluid pressure operated valve mechanism, and a check valve in one of said first mentioned lines for preventing return flow of pressure fluid to said main reservoir; an independently operable means associated with said fluid pressure operated valve mechanism responsive to the actuation of said application valve for permitting flow of pressure fluid from said auxiliary reservoir to said brake operating cylinders, and a second independently operable means associated with said fluid pressure operated valve mechanism operable below a predetermined main reservoir pressure for automatically supplying pressure fluid to said brake cylinders from said auxiliary reservoir; said second independently operable means comprising a pressure responsive emergency means subject to the pressure in said main reservoir on one side and to the pressure of the auxiliary reservoir on the other side, an emergency valve stem having a passageway therein, a resilient means for normally biasing said pressure responsive emergency means against said valve stem for controlling said passageway, a normally open exhaust passage about said valve stem for venting fluid from said brake cylinders by operation of said first mentioned independently operable means, a valvular means on said valve stem for controlling said exhaust passage, and a second resilient means for biasing said valvular means to a passage closing position.

References Cited in the file of this patent

UNITED STATES PATENTS

| Number | Name | Date |
|---|---|---|
| 1,438,317 | Lewis | Dec. 12, 1922 |
| 2,018,212 | Johnson | Oct. 22, 1935 |
| 2,203,042 | Boldt | June 4, 1940 |
| 2,289,559 | Turek | July 14, 1942 |
| 2,441,050 | Wiegers | May 4, 1948 |